United States Patent
Kambhatla et al.

(10) Patent No.: US 11,948,200 B2
(45) Date of Patent: Apr. 2, 2024

(54) DAMAGE CLAIM CLUSTERING FOR PREDICTING UNDERWRITING RISK

(71) Applicant: LexisNexis Risk Solutions Inc., Alpharetta, GA (US)

(72) Inventors: Prasanth Kambhatla, Suwanee, GA (US); John Beal, Milton, GA (US); George Hosfield, Alpharetta, GA (US); Veli-Heikki Vesanto, Dublin (IE); Daniel Bang, Dublin (IE)

(73) Assignee: LexisNexis Risk Solutions, Inc., Alpharetta, GA (US)

( * ) Notice: Subject to any disclaimer, the term of this patent is extended or adjusted under 35 U.S.C. 154(b) by 0 days.

(21) Appl. No.: 17/409,860

(22) Filed: Aug. 24, 2021

(65) Prior Publication Data
US 2023/0060374 A1 Mar. 2, 2023

(51) Int. Cl.
*G06Q 40/08* (2012.01)
*G06N 7/01* (2023.01)
*G01W 1/00* (2006.01)

(52) U.S. Cl.
CPC ............... *G06Q 40/08* (2013.01); *G06N 7/01* (2023.01); *G01W 1/00* (2013.01)

(58) Field of Classification Search
CPC ...................................... G06Q 40/08
USPC ........................................... 705/4
See application file for complete search history.

(56) References Cited

U.S. PATENT DOCUMENTS 10,373,256 B1 * 8/2019 Allen ..................... G06Q 10/10

* cited by examiner

*Primary Examiner* — Cho Kwong
(74) *Attorney, Agent, or Firm* — Troutman Pepper Hamilton Sanders LLP; James E. Schutz; Mark Lehi Jones

(57) ABSTRACT

Systems and methods for estimating current roof conditions and potential underwriting risk using insurance claim data. Historical claims for confirmed weather-damaged homes may be clustered by claims stemming from one or more weather events to determine potential areas where damage has occurred, but a claim has not yet been filed. In certain implementation, claims for weather-related vehicle damage may be utilized to predict weather-related roof damage.

20 Claims, 8 Drawing Sheets

DAMAGE CLAIM CLUSTERING FOR PREDICTING UNDERWRITING RISK

CROSS-REFERENCE TO RELATED APPLICATIONS

The following related applications are incorporated by reference in their entirety as if presented in full: U.S. patent application Ser. No. 12/637,286, entitled "METHOD AND SYSTEM FOR LINKING AND DELINKING DATA RECORDS," filed 14 Dec. 2009, and published 15 Apr. 2010 as U.S. Patent Publication No. 20100094910, now U.S. Pat. No. 9,015,171, issued 1 Apr. 2015; and U.S. patent application Ser. No. 12/188,742, entitled "DATABASE SYSTEMS AND METHODS FOR LINKING RECORDS AND ENTITY REPRESENTATIONS WITH SUFFICIENTLY HIGH CONFIDENCE," filed 8 Aug. 2008, and published 29 Oct. 2009 as U.S. Patent Publication No. 20090271424, now U.S. Pat. No. 8,266,168, issued 11 Sep. 2013.

FIELD

The disclosed technology generally relates to predicting property damage claims, and in particular, to utilizing spatial clusters of claims due to weather events to predict current property conditions and potential future claims.

BACKGROUND

Hailstorms, heavy winds, and other severe weather events are often cited as common causes of property damage. Current statistics show that the United States has about 75 million single-family homes and approximately 6.2 million properties in the United States experienced one or more damaging hail events in 2020. Roofing and associated structures can become damaged by hail, tree limbs, flying debris, wind, etc. Hailstorms and other severe weather events can also damage vehicles, often resulting in cracked windshields and dents in the body. It is estimated that 80% of automobile claims for damage are filed within 6 months of the damage-causing event. Since vehicular damage is likely to be noticed within a short period, quickly followed by an insurance claim, the long-term damage vulnerability associated with a hail-damaged vehicle is relatively low compared with a hail-damaged roof.

Depending on the damage severity, a homeowner may or may not be able to detect roof damage immediately, and it can take months or years after the weather event before the damage is noticed because such damage is often out-of-sight. Thus, there can be a long-term vulnerability associated with a roof that has been compromised by a weather-related event.

Homeowners and/or insurance companies can fall prey to opportunistic roofing companies after a damaging storm passes through an area. A roofing company, for example, may follow severe weather events in search of damaged roofs, often traveling door-to-door, passing out leaflets, and offering to repair or replace roofs that look damaged or, in some instances, roofs that are not damaged at all. The roofer may convince homeowners to get a new roof by filing an insurance claim after a big storm. In many cases, the roofer gets paid, the homeowner gets a new roof, even if it's not needed, and the insurance company pays for part or all of the roofing job minus the policy deductible.

Insurance companies that underwrite new homeowner's insurance policies or renew existing insurance policies often do not have enough accurate information to assess the condition of the property. An agent will typically gather general information such as the name and address of the requesting entity, the requested coverage type, the desired amount of coverage, etc. The premium will then be set based on the amount of coverage, the agreed-upon deductible, and associated exposure risks. Those skilled in the insurance industry understand that certain geographical regions can have a higher-than-average frequency of hailstorms. While such information can be used to determine high-risk zones, the process of underwriting a policy is manually intensive, very slow, and often produces inconsistent and inaccurate results due to hidden risks.

A need exists for improved methods for evaluating the risk associated with underwriting an insurance policy.

BRIEF SUMMARY

The disclosed technology includes systems and methods for predicting damage to a target property.

A method is provided that includes receiving, via a network, a plurality of indicators corresponding to property claim damage, each of the indicators including an address of the damaged property, a type of damage, a monetary claim amount, and a claim date corresponding to the damaged property. The method includes calculating, for each of the indicators, a first distance from a target property to the address of the damaged property, calculating second distances among each damaged property, aggregating the property damage claim indicators by two or more of the claim date, the type of damage, the first distance; and the monetary claim amount. The method includes generating clusters having enclosed areas according to claim dates within a predetermined timeframe and the second distances that are within a threshold distance, calculating an unclaimed damage potential of the target property based on proximity of one or more of the clusters to the target property, and outputting a claim propensity score based on the unclaimed damage potential.

A system is also provided for predicting damage to a target property. The system includes a processor and a memory having programming instructions stored thereon, which, when executed by the processor, cause the processor to receive, via a network in communication with the processor, a plurality of indicators corresponding to property claim damage, each of the indicators including an address of the damaged property, a type of damage, a monetary claim amount, and a claim date corresponding to the damaged property. The instructions further cause the processor to calculate, for each of the indicators, a first distance from a target property to the address of the damaged property, calculate second distances among each damaged property, aggregate the property damage claim indicators by two or more of the claim date, the type of damage, the first distance, and the monetary claim amount. The instructions further cause the processor to generate clusters having enclosed areas according to claim dates within a predetermined timeframe and the second distances that are within a threshold distance, calculate an unclaimed damage potential of the target property based on proximity of one or more of the clusters to the target property, and output a claim propensity score based on the unclaimed damage potential.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE DRAWINGS

Reference will now be made to the accompanying figures and flow diagrams, which are not necessarily drawn to scale.

DETAILED DESCRIPTION

Figure 1:
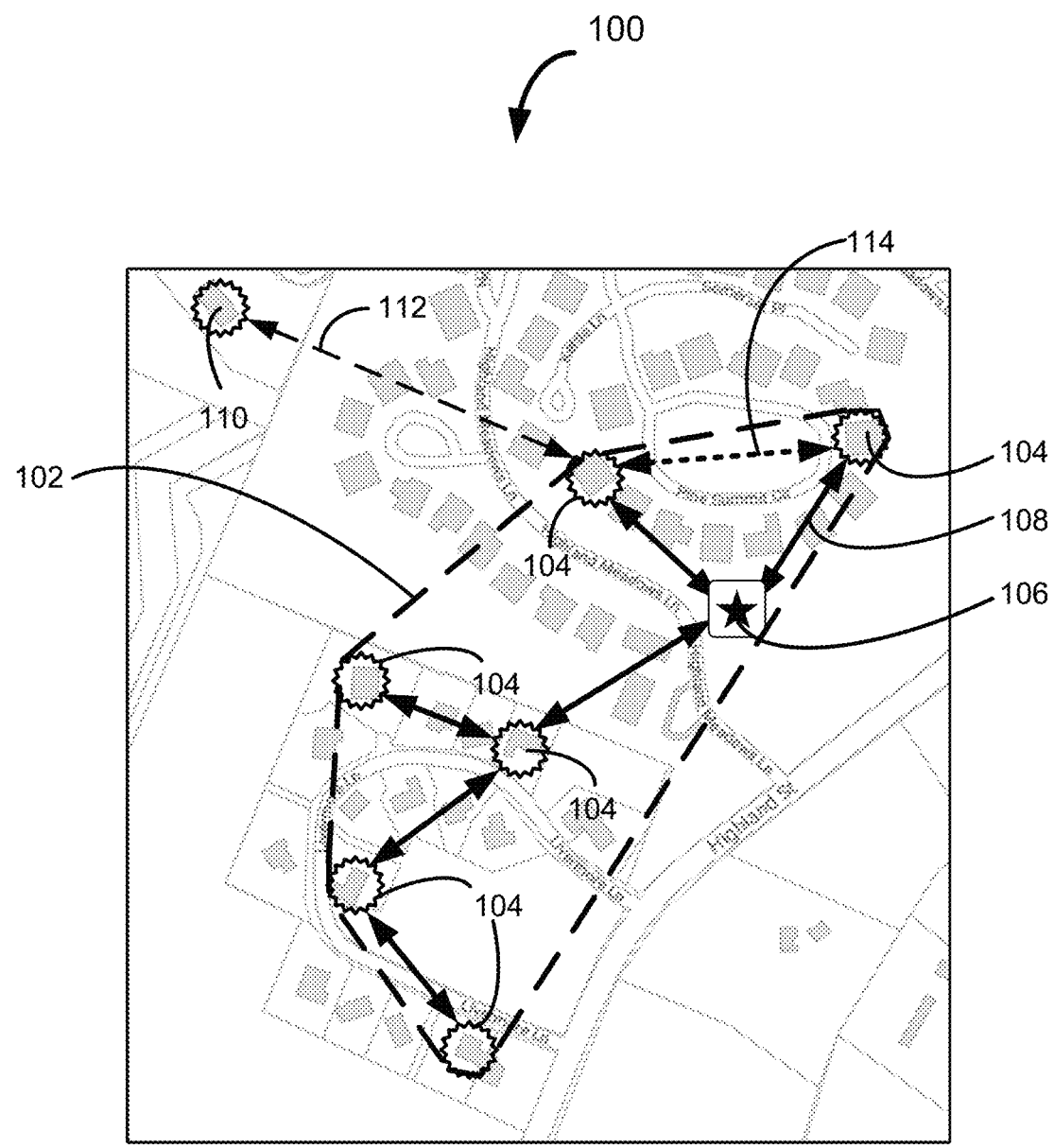
FIG. 1 illustrates an example cluster of claim addresses around a target address, where the cluster polygon boundary can be set by various criteria.

The disclosed technology may be utilized to estimate current conditions and/or potential future insurance claims for an asset (such as a building roof, dwelling, residence, surrounding area, etc.,) using insurance claim data. Historical claims and/or confirmed weather-damaged homes may be clustered by claims stemming from one or more weather events to spot potential areas where damage has occurred, but a claim has not yet been filed. In certain exemplary implementations, historical weather data may be utilized to corroborate the claims data.

Certain aspects of the disclosed technology can utilize "fast" claims to predict "slow" claims. For example, a claim for hail damage to a vehicle would generally be considered fast because the associated damage would be easily noticed, and the corresponding claim would typically be filed with the insurance company within a short period after the damaging weather event. However, hail and/or wind damage that is not immediately noticed after the weather event could be considered slow if the claim is not immediately submitted after the weather event. A slow claim could stem from a weather event that happened weeks, months, or even years before submitting the claim.

In certain exemplary implementations, clusters of claims based on historical claim data may be used as claim event indicators in a region. In certain exemplary implementations, modeling for the clustering may take into account a number of days that have clusters overlapping or nearby a given address (converted to a latitude and longitude) within a given timeframe. The result can be used for determining a given peril trend in the surrounding area.

In some implementations, three or more claims filed within a selectable timeframe (for example, within the same day, within a multi-day period, within the same week, etc.) in the selectable proximity of a property in each cluster may be used to form a polygon. In some implementations, the selectable proximity may be within one to three miles. In some implementations, the selectable proximity may be within zero to three miles. In some implementations, the selectable proximity may be within zero to five miles.

In accordance with certain exemplary implementations of the disclosed technology, there may be no minimum requirement for a certain number of claims to be in a cluster to be predictive of future claims. In certain exemplary implementations, a claims cluster may be a geospatial aggregation of claims within a proximity of a property that provides 'ground truth' for the area of damage around a property.

In certain exemplary implementations, claim clusters may be used as a replacement or enhancement of historical weather events. The use and method are not limited to this particular use case and further claim domains such as auto claims can be added as indicators of historical perils in the area.

In certain exemplary implementations of the disclosed technology, a model may be used to build clusters based on one or more selected criteria, such as geographical location, the distance between addresses, claim date, damage type, monetary claim amount, etc. In certain implementations, the clusters may be formed over time, for example, as new weather events occur, and as corresponding claims are filed. In certain exemplary implementations, the model may be utilized to evaluate the ability of the cluster to predict future claims for assets within or near the cluster boundary. In certain exemplary implementations, a cluster's predictability score may be evaluated and/or updated by the model as the clusters form. In certain exemplary implementations, clusters may have an evaluated predictability score that changes over time. For example, the predictive score may be low in the early stages of cluster formation, but the predictive score may increase with time as the cluster forms as new claims emerge within or near an existing cluster boundary. Such new claims may strengthen the predictive nature of the cluster.

In certain implementations, once a cluster has a threshold density of claims that meet certain criteria, the other assets/properties within the cluster boundary (that have not previously submitted a claim for damage) may be assigned an underwriting risk score (i.e., a claim propensity score) that is higher than assets/properties outside of the cluster boundary. In certain exemplary implementations, the underwriting risk score and/or the predictive score may be sent to insurance carriers to enhance their underwriting process for risk selection, segmentation, and/or accuracy. In certain exemplary implementations, insurance rates for a specific region may be set based on the underwriting risk score and/or the predictive score. In some implementations, one or more of the underwriting score, the predictive score, and/or the associated attributes may be used to screen new business customers for inspection referrals. In certain exemplary implementations, the underwriting score, the predictive score, and/or the associated attributes may score may automatically trigger a request for additional documentation for verification of the characteristics of a roof. In some implementations, such scores and/or attributes may be utilized to dispatch an inspector. In some implementations, such scores may be used to send an alert to a homeowner. In certain exemplary implementations, the use of claims clusters, as discussed herein, may be utilized for verifying certain claims. In some implementations, the claims clustering may be used to determine trends and/or benchmarking, for example, to determine loss patterns. In certain exemplary implementations, an assessment of non-insurance-based environmental risk based on the of claims clustering may be utilized to identify the condition of an asset from a remote location.

Various example embodiments of the disclosed technology now will be described more fully hereinafter with reference to the accompanying drawings, in which some, but not all embodiments of the disclosure are shown. This technology may, however, be embodied in many different forms and should not be construed as limited to the implementations set forth herein; rather, these implementations are provided so that this disclosure will be thorough and complete, and will convey the scope of the disclosed technology to those skilled in the art.

FIG. 1 illustrates an example cluster 100 of claim addresses 104 having a boundary 102 enclosing the claim addresses 104 and a target address 106. The claim addresses 104, for example, can correspond to locations for which insurance claims have been filed for damaged property (such as a homeowner's roof or vehicle) due to a previous weather event. The target address 106, for example, may correspond to a building/dwelling within the boundary 102 in the vicinity of the claim addresses 104. In accordance with certain exemplary implementations of the disclosed technology, the boundary 102 for the cluster 100 can be set or adjusted using various criteria, such as the geographical location of the addresses 104 associated with the claimed damage, distance 108 between addresses 104, claim date(s), damage types, and/or monetary claim amounts.

Certain implementation of the disclosed technology may utilize a distance 108 between addresses 104 to set the polygon boundary 102 so that the cluster 100 includes only the addresses 104 that are within a threshold distance 114 of each other, while an address 110 that is separated 112 from the other addresses 104 by more than a selected threshold distance 114 is excluded from the cluster 100. In this case, the address 110 may be associated with weather-related damage and an insurance claim, but since it is located too far away (greater than a selected threshold distance 114) from the other addresses 104, it may be excluded from the cluster 100, even though it may be a member of another nearby cluster.

In some implementations, the boundary 104 may be a simple polygon having straight, non-intersecting line segments that form a closed path that does not intersect itself and has no gaps. In certain implementations, the boundary 104 may be a convex hull polygon. A convex hull around a set of points, for example, is the smallest convex set or boundary that contains the set of points. For a bounded subset of claim addresses 104, the convex hull may be visualized as the shape enclosed by a rubber band that is stretched around the subset of claim addresses 104 that meet selected criteria, as illustrated in FIG. 1.

In certain exemplary implementations, the cluster 100 may provide a novel way to distinguish assets (such as homes, commercial buildings, etc.,) that have an increased likelihood of future claims stemming from one or more weather events where damage has occurred, but a claim has not yet been filed.

Figure 2:
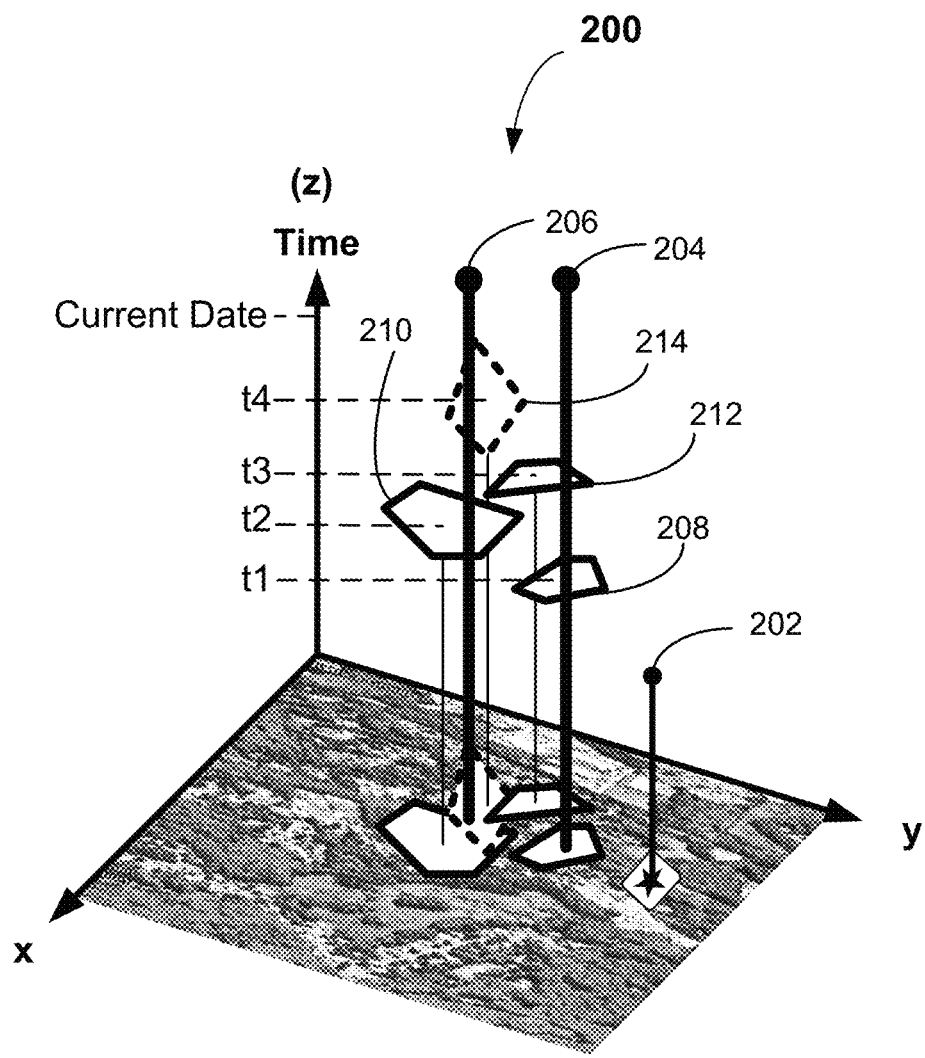
FIG. 2 illustrates a temporal-spatial map in which different weather events and associated regions may be mapped to create historical clusters.

FIG. 2 illustrates an example temporal-spatial set of clusters 200 in which different historical weather events and associated clusters 208 210 212 214 may be mapped to create historical cluster representations. In this example implementation, time is represented on the z-axis. Multiple clusters 208 210 212 214 corresponding to multiple claim dates (and/or weather event dates) t1 t2 t3 t4 may be generated via selected criteria (geographical location, distance between addresses, claim date, damage type, monetary claim amount, etc.,) as discussed above with respect to FIG. 1. As illustrated in FIG. 2, a first address 204 may be associated with an insurance claim at time=t1, which may be the result of a weather event that happened at or before t1. A second address 206 may be associated with overlapping historical clusters 200, for example, one hail-related cluster 210 at time=t2 and a high-wind cluster 214 at time=t4. Thus, in certain embodiments, a single address, such as address 206, can be associated with multiple overlapping clusters, each resulting from claims from different weather events.

As illustrated in FIG. 2, a target address 202 proximal to the set of clusters 200 may be evaluated for a likelihood of future claims stemming from one or more weather events where damage has occurred, but a claim has not yet been filed. One potential technical improvement and advantage associated with the temporal mapping of the clusters 200 is that it can provide an enhanced indication of underwriting risk using historical claims data that spans multiple weather events on different dates. As illustrated by this example, geography and/or prevailing weather patterns may create weather "danger zones" that may be identified by overlapping clusters, groupings of clusters, the spatial density of clusters, and/or clusters of clusters.

Certain example implementations of the disclosed technology provide tangible improvements in computer processing speeds, memory utilization, and/or programming languages. Such improvements provide certain technical contributions that can enable the analysis of historical insurance claims to predict future claims. In certain example implementations, the improved computer systems disclosed herein may enable an analysis of an entire population, such as all known persons in the United States, together with the associated property. The computation of such a massive amount of data, at the scale required to provide effective outlier detection and information, has been enabled by the improvements in computer processing speeds, memory utilization, and/or programming language as disclosed herein. Those with ordinary skill in the art may recognize that traditional methods such as human activity, pen-and-paper analysis, or even traditional computation using general-purpose computers and/or off-the-shelf software, are not sufficient to provide the level of data processing for effective data mining. As disclosed herein, the special-purpose computers and special-purpose programming language(s) disclosed herein can provide improved computer speed and/or memory utilization that provides an improvement in computing technology, thereby enabling the disclosed technology.

Certain example implementations of the disclosed technology may be enabled by the use of a special purpose HPCC systems in combination with a special purpose software linking technology called Scalable Automated Linking Technology (SALT). SALT and HPCC, are developed and offered by LexisNexis Risk Solutions, Inc., the assignee of the disclosed technology. HPCC Systems, for example, provide data-intensive supercomputing platform(s) designed for solving big data problems. As an alternative to Hadoop, the HPCC Platform offers a consistent, single architecture for efficient processing. The SALT modules, in conjunction with the HPCC Systems, provide technical improvements in computer processing that enable the disclosed technology and provides useful, tangible results that may have previously been unattainable. For example, certain example implementations of the disclosed technology may process massive data sets, which are computationally intensive, requiring special software and hardware.

One of the issues that have plagued previous insurance underwriting solutions involving massive data sets is the extremely long run times and a large amount of memory/disk space required. One of the technical solutions provided by the technology disclosed herein concerns the enablement and efficiency improvement of computer systems and software to process claims data and to provide the desired predictions in a reasonable amount of time. Certain example implementations of the disclosed technology may be utilized to increase the efficiency of detection of potential underwriting risks.

Certain implementations of the disclosed technology may determine temporal and/or spatial relationships among claims records. Such relationships follow the classical n-squared process for both time and disk space. According to an example implementation of the disclosed technology, SALT provides a process in which light-weight self-joins may be utilized, for example, in generating embeddable common lisp (ECL). But disk-space utilization might still be high. Certain example implementations of the disclosed technology may enable a core join to be split into parts, each of which is persisted. This has the advantage of breaking a potentially very long join into n parts while allowing others a time slice. This has the effect of reducing disk consumption by a factor of n, provided the eventual links are fairly sparse. In terms of performance, it should be noted that if n can be made high enough that the output of each join does not spill to disk, the relationship calculation process may have significantly faster performance.

In accordance with certain example implementations, linking of records may be performed by certain additional special programming and analysis software. For example, record linking fits into a general class of data processing known as data integration, which can be defined as the problem of combining information from multiple heterogeneous data sources. Data integration can include data preparation steps such as parsing, profiling, cleansing, normalization, and parsing and standardization of the raw input data prior to record linkage to improve the quality of the input data and to make the data more consistent and comparable (these data preparation steps are sometimes referred to as ETL or extract, transform, load).

Some of the details for the use of SALT are included in the APPENDIX section of this application. According to an example implementation of the disclosed technology, SALT can provide data profiling and data hygiene applications to support the data preparation process. In addition, SALT can provide a general data ingest application that allows input files to be combined or merged with an existing base file. SALT may be used to generate a parsing and classification engine for unstructured data which can be used for data preparation. The data preparation steps are usually followed by the actual record linking or clustering process. SALT provides applications for several different types of record linking including internal, external, and remote.

Data profiling, data hygiene, and data source consistency checking, while key components of the record linking process, have their own value within the data integration process and may be supported by SALT for leverage even when record linking is not a necessary part of a particular data work unit. SALT uses advanced concepts such as term specificity to determine the relevance/weight of a particular field in the scope of the linking process, and a mathematical model based on the input data, rather than the need for hand-coded user rules, which may be key to the overall efficiency of the method.

In accordance with an example implementation of the disclosed technology, and as discussed above, a persistent data structure may be utilized as a part of splitting a core join, for example, to increase the performance of the computer processor and/or to reduce the disc/memory utilization requirements in determining relationships among records. The persistent data structure, according to certain example implementations of the disclosed technology, is a data structure that preserves the previous version of itself when it is modified. Such data structures may be effectively immutable, as their operations do not update the structure in place, but instead may yield a new updated structure. Certain example implementations may utilize a meld or merge operation that can create a new version from two previous versions. In certain example implementations, the persistent data structure(s) can also be created using in-place updating of data and these may, in general, use less time or storage space than their purely functional counterparts. In certain example implementations, persistence can be achieved by simple copying. Certain example implementations of the disclosed technology exploit a similarity between the new and old versions to share structure between versions.

Certain example implementations provide for disambiguating input information. In accordance with an example implementation of the disclosed technology, the input information may be processed, weighted, scored, etc., for example, to disambiguate the information. Certain implementations, for example, may utilize one or more input data fields to verify or correct other input data fields. In certain example implementations, data may be received from a first information source that is associated with an asset. According to an example implementation of the disclosed technology, independent data from a second information source may be received to check or verify the data that is received from the first information source.

Figure 3:
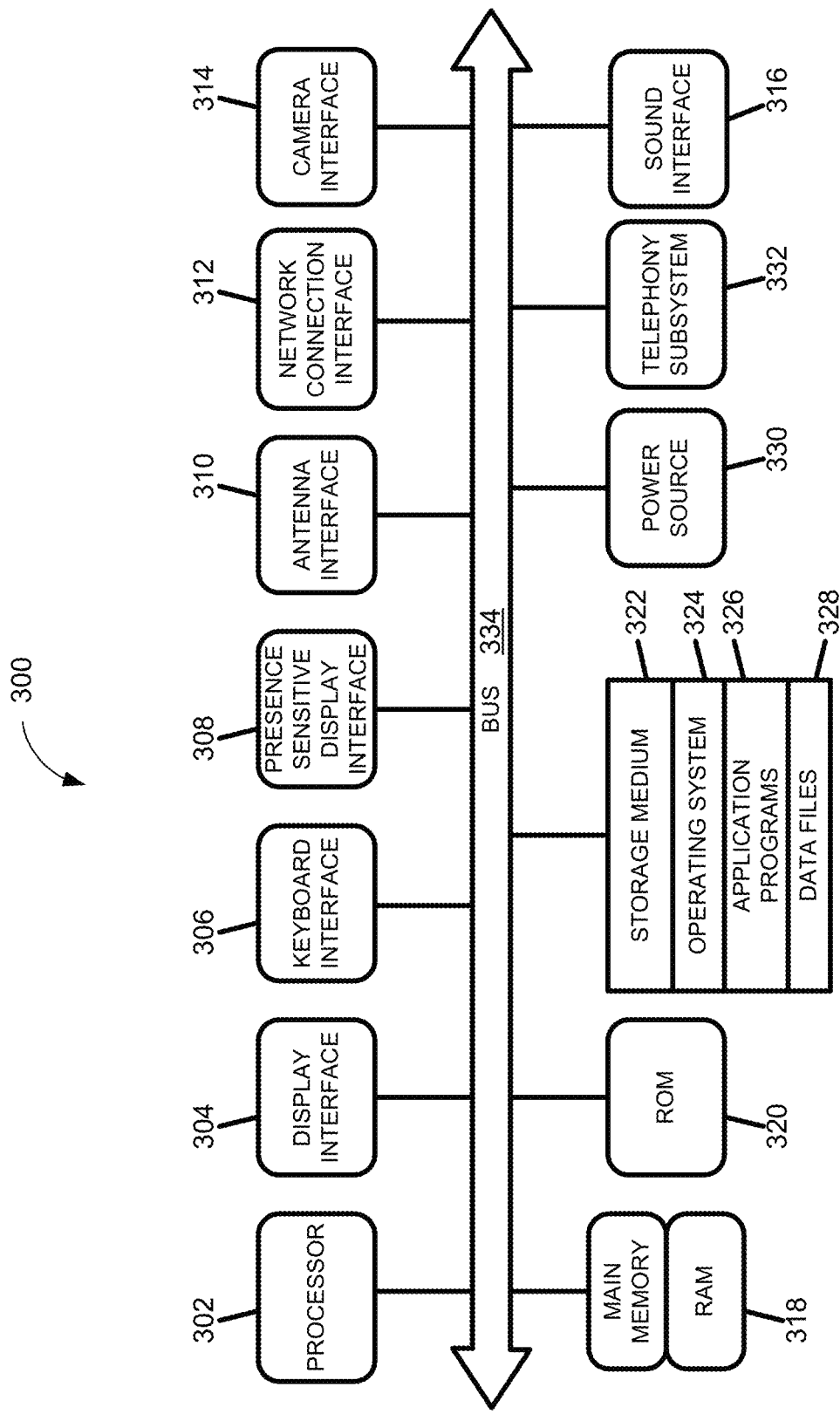
FIG. 3 is a block diagram of a computing device utilized in the system, in accordance with certain example implementations of the disclosed technology.

FIG. 3 depicts a block diagram of an illustrative computing device 300 that may be utilized to enable certain aspects of the disclosed technology. Various implementations and methods herein may be embodied in non-transitory computer-readable media for execution by a processor. It will be understood that the computing device 300 is provided for example purposes only and does not limit the scope of the various implementations of the communication systems and methods.

The computing device 300 of FIG. 3 includes one or more processors where computer instructions are processed. The computing device 300 may comprise the processor 302, or it may be combined with one or more additional components shown in FIG. 3. In some instances, a computing device may be a processor, controller, or a central processing unit (CPU). In yet other instances, a computing device may be a set of hardware components.

The computing device 300 may include a display interface 304 that acts as a communication interface and provides functions for rendering video, graphics, images, and texts on the display. In certain example implementations of the disclosed technology, the display interface 304 may be directly connected to a local display. In another example implementation, the display interface 304 may be configured for providing data, images, and other information for an external/remote display. In certain example implementations, the display interface 304 may wirelessly communicate, for example, via a Wi-Fi channel or other available network connection interface 312 to the external/remote display.

In an example implementation, the network connection interface 312 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 304 may be operatively coupled to a local display. In another example, the display interface 304 may wirelessly communicate, for example, via the network connection interface 312 such as a Wi-Fi transceiver to the external/remote display.

The computing device 300 may include a keyboard interface 306 that provides a communication interface to a keyboard. According to certain example implementations of the disclosed technology, the presence-sensitive display interface 308 may provide a communication interface to various devices such as a pointing device, a touch screen, etc.

The computing device 300 may be configured to use an input device via one or more of input/output interfaces (for example, the keyboard interface 306, the display interface 304, the presence-sensitive display interface 308, network connection interface 312, camera interface 314, sound interface 316, etc.,) to allow a user to capture information into the computing device 300. The input device may include a mouse, a trackball, a directional pad, a trackpad, a touch-verified trackpad, a presence-sensitive trackpad, a presence-sensitive display, a scroll wheel, a digital camera, a digital video camera, a web camera, a microphone, a sensor, a smartcard, and the like. Additionally, the input device may be integrated with the computing device 300 or may be a separate device. For example, the input device may be an accelerometer, a magnetometer, a digital camera, a microphone, and an optical sensor.

Example implementations of the computing device 300 may include an antenna interface 310 that provides a communication interface to an antenna; a network connection interface 312 that provides a communication interface to a network. According to certain example implementations, the antenna interface 310 may utilize to communicate with a Bluetooth transceiver.

In certain implementations, a camera interface 314 may be provided that acts as a communication interface and provides functions for capturing digital images from a camera. In certain implementations, a sound interface 316 is provided as a communication interface for converting sound into electrical signals using a microphone and for converting electrical signals into sound using a speaker. According to example implementations, random-access memory (RAM) 318 is provided, where computer instructions and data may be stored in a volatile memory device for processing by the CPU 302.

According to an example implementation, the computing device 300 includes a read-only memory (ROM) 320 where invariant low-level system code or data for basic system functions such as basic input and output (I/O), startup, or reception of keystrokes from a keyboard are stored in a non-volatile memory device. According to an example implementation, the computing device 300 includes a storage medium 322 or other suitable types of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, a web browser application, a widget or gadget engine, and or other applications, as necessary) and data files 328 are stored. According to an example implementation, the computing device 300 includes a power source 330 that provides an appropriate alternating current (AC) or direct current (DC) to power components. According to an example implementation, the computing device 300 includes and a telephony subsystem 332 that allows the device 300 to transmit and receive sound over a telephone network. The constituent devices and the CPU 302 communicate with each other over a bus 334.

In accordance with an example implementation, the CPU 302 has an appropriate structure to be a computer processor. In one arrangement, the computer CPU 302 may include more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 to execute software programs. Data may be stored in the RAM 318, where the data may be accessed by the computer CPU 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer-readable storage media allow the device 300 to access computer-executable process steps, application programs, and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

According to one example implementation, the term computing device, as used herein, may be a CPU, or conceptualized as a CPU (for example, the CPU 302 of FIG. 3). In this example implementation, the computing device (CPU) may be coupled, connected, and/or in communication with one or more peripheral devices.

Figure 4:
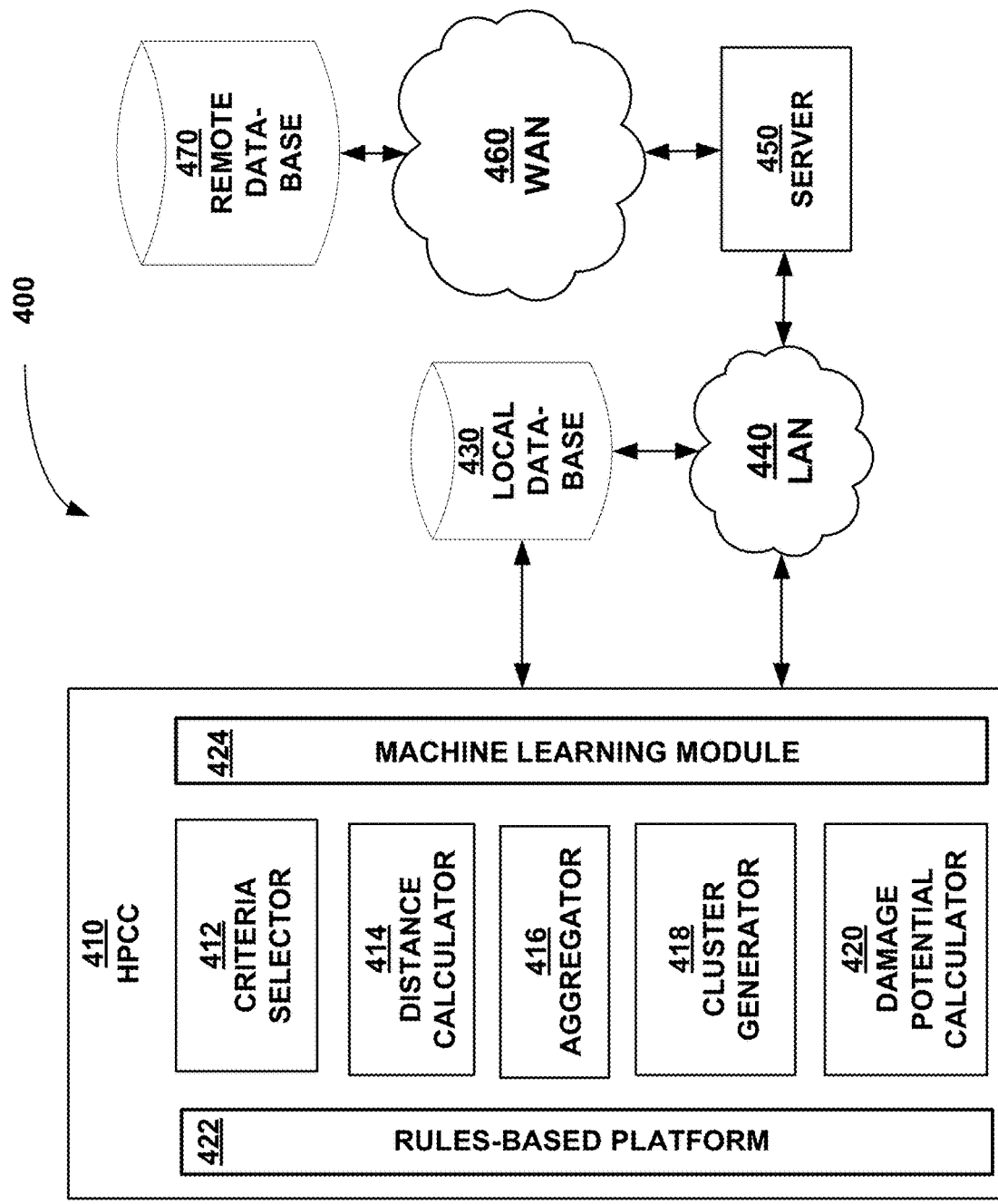
FIG. 4 is an example block diagram of a system according to an example implementation of the disclosed technology.

FIG. 4 is an example block diagram of a system 400 that may be utilized to aggregate and cluster historical claims data and calculate associated damage potential, according to an example implementation of the disclosed technology. In certain implementations, the system 400 may include (or be embodied as) one or more of the computing device 300 components as discussed above with reference to FIG. 3. In certain implementations, the system 400 may be embodied as a special purpose HPCC system 410 as discussed above, and may utilize one or more special-purpose modules, including but not limited to: a criteria selector 412, a distance calculator 414, an aggregator 416, a cluster generator 418, a damage potential calculator 420, a rules-based platform 422, and a machine learning module 424.

According to an exemplary implementation of the disclosed technology, one or more of the rules-based platform 422 and the machine learning module 424 may interact with one or more of the criteria selector 412, the distance calculator 414, the aggregator 416, the cluster generator 418, and/or the damage potential calculator 420. In some implementations, the rules-based platform 422 may provide input criteria to the criteria selector 412. In some implementations, the trained machine learning model 424 may provide input criteria to the criteria selector 412. In some implementations, the input criteria may be handled by both the rules-based platform 422 and the machine learning module 424 working in concert. In some embodiments, the machine learning model 424 may be used as a way of enhancing the performance of the rules-based platform 422 by, for example, determining which rules have priority over other rules and what rules should be applied in a given context.

In accordance with certain exemplary implementations of the disclosed technology, the criteria selector 412 may receive manual and/or automatic selection of one or more criteria for evaluating claims data. Such criteria may be selected among, for example, geographical location, the distance between addresses, maximum threshold distances between addresses, claim date, damage type, monetary claim amount, etc.

In certain example implementations, the HPCC system 410 may be in communication with one or more local database(s) 430. In certain example implementations, the HPCC system 410 may be in communication with a server 450, for example via a local area network 440. In certain implementations, the server may be in communication to a wide area network 460 (such as the Internet) to enable remote access to the HPCC system 410. In certain implementations, one or more remote database(s) 470 may be in communication with the wide area network 470, for example, to store data and/or to retain processed data. In certain exemplary implementations, the claim data may be stored on the local database 430 and or one or more remote databases 470.

Figure 5:
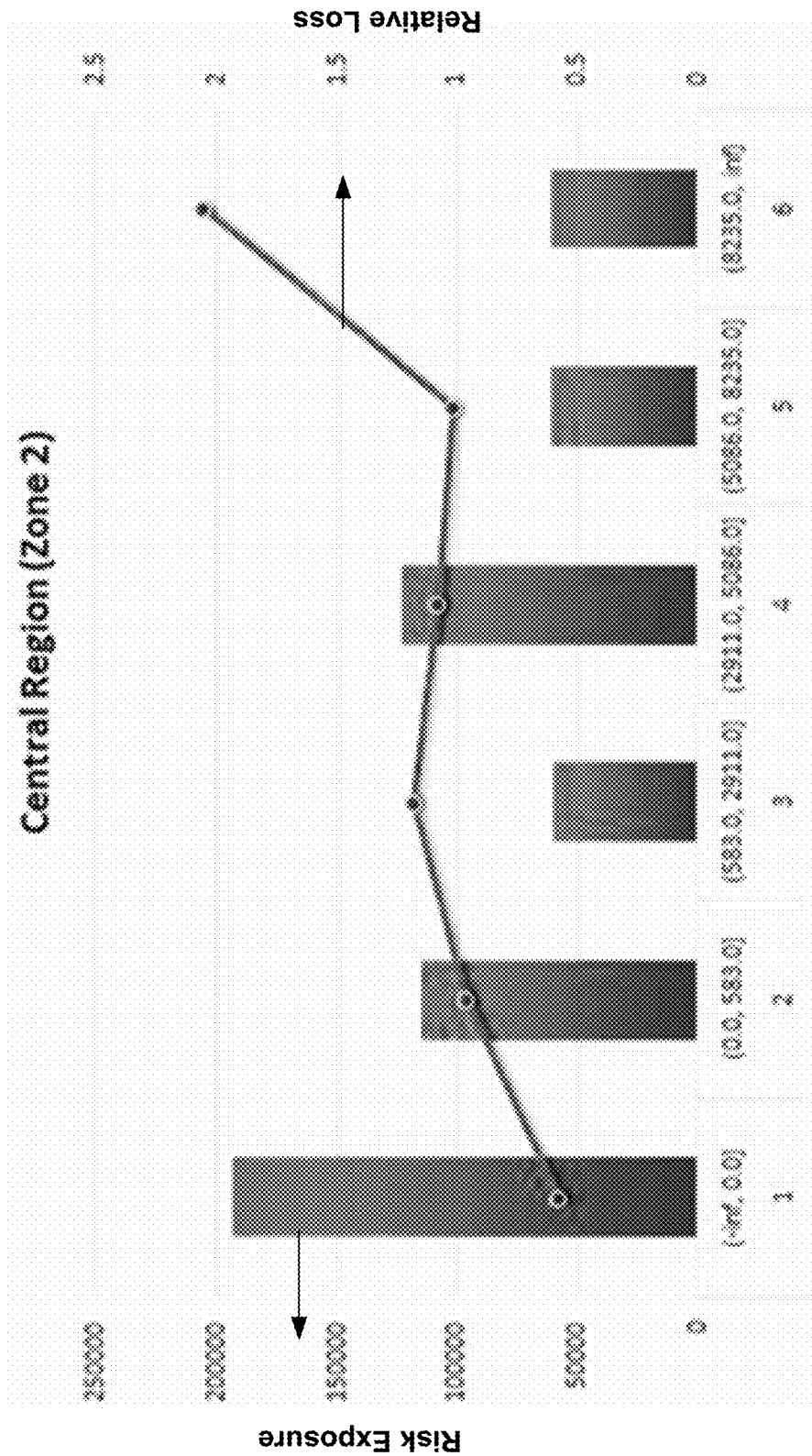
FIG. 5 is a chart of claim rate relative loss and risk exposure trend for a Central Region of the U.S. (zone 2) as a function of automobile damage value.

FIG. 5 is a histogram chart of claim rate risk exposure (left vertical axis) and relative loss (right vertical access) trends for a Central Region of the U.S. (zone 2) where the histogram bins are segmented into automobile damage dollar values for a ~1-mile radius clusters over 3 years. As indicated in the relative loss line, the claim rate relativity for the clusters becomes 2× compared to the average for automobile damage value over $8235.

Figure 6:
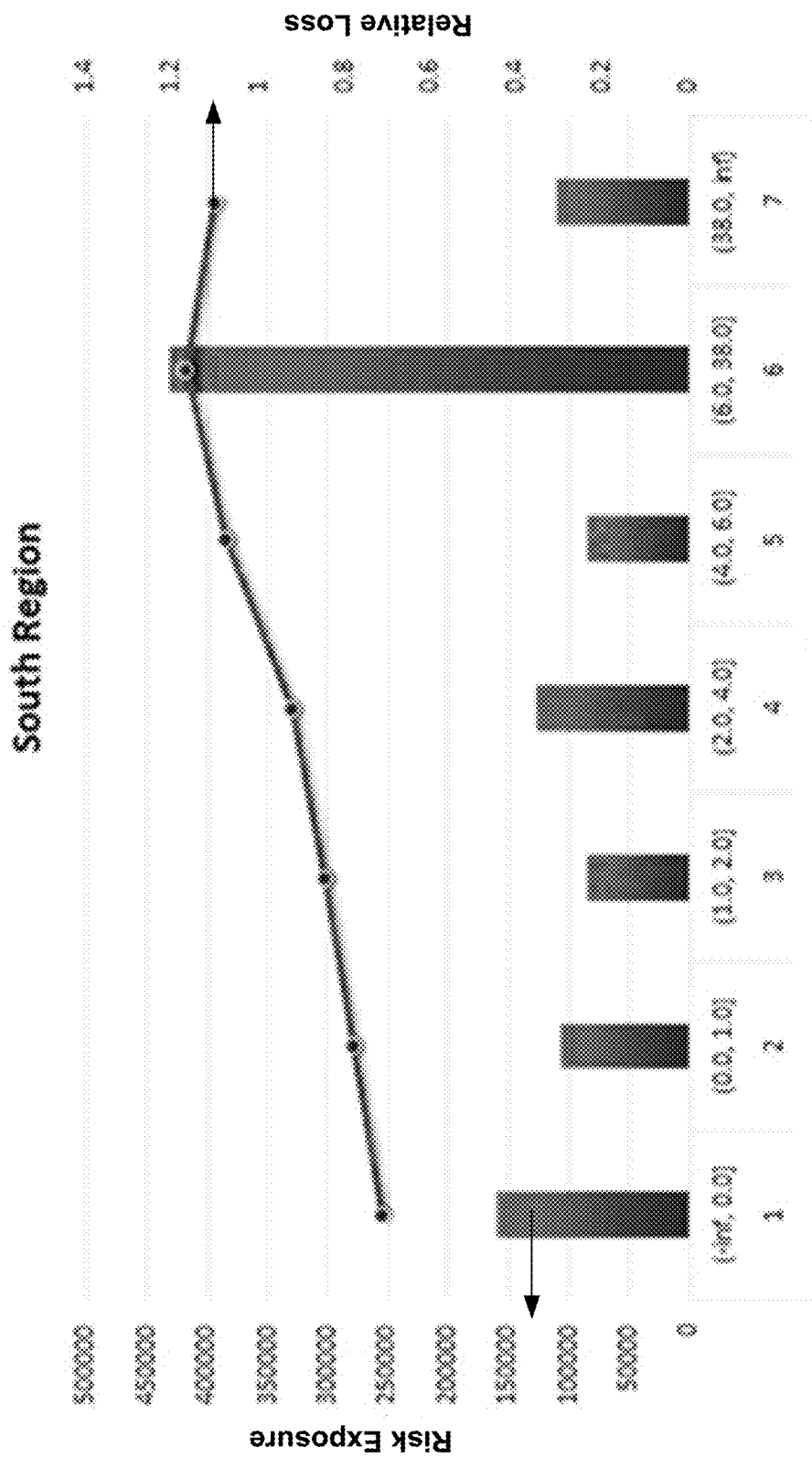
FIG. 6 is a chart of claim rate relative loss and risk exposure trend for a South Region of the U.S. as a function of a number of wind damage claims for clusters.

FIG. 6 is a histogram chart of claim rate risk exposure (left vertical axis) and relative loss (right vertical access) trends for a South Region of the U.S. as a function of wind damage, where the histogram bins are segmented into the number of claims for ~1-mile radius clusters over 10 years. As indicated in the relative loss line, the claim rate relativity is about 0.7× the average for zero claims but reaches about 1.2× the average for more than 6 claims.

Figure 7:
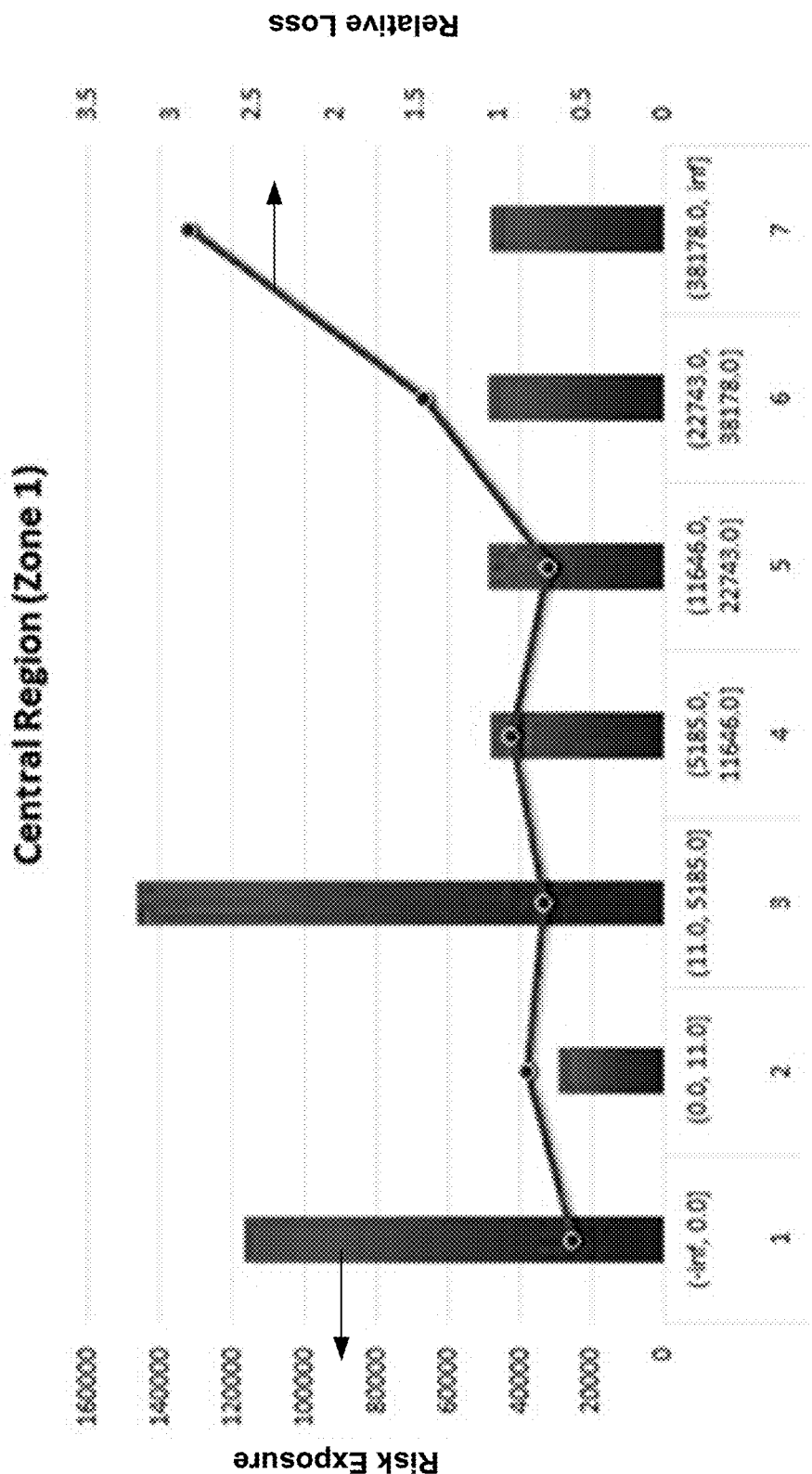
FIG. 7 is a chart of claim rate relative loss and risk exposure trend for a Central Region of the U.S. (zone 1) as a function of a number of automobile damage claims for clusters.

FIG. 7 is a histogram chart of claim rate risk exposure (left vertical axis) and relative loss (right vertical access) trends for a Central Region of the U.S. (zone 1) where the histogram bins are segmented into the number of automobile damage claims for ~1-mile radius clusters over 3 years. As indicated in the relative loss line, the claim rate relativity for the clusters begins to rise and becomes more apparent for clusters having —12 thousand or more claims.

Figure 8:
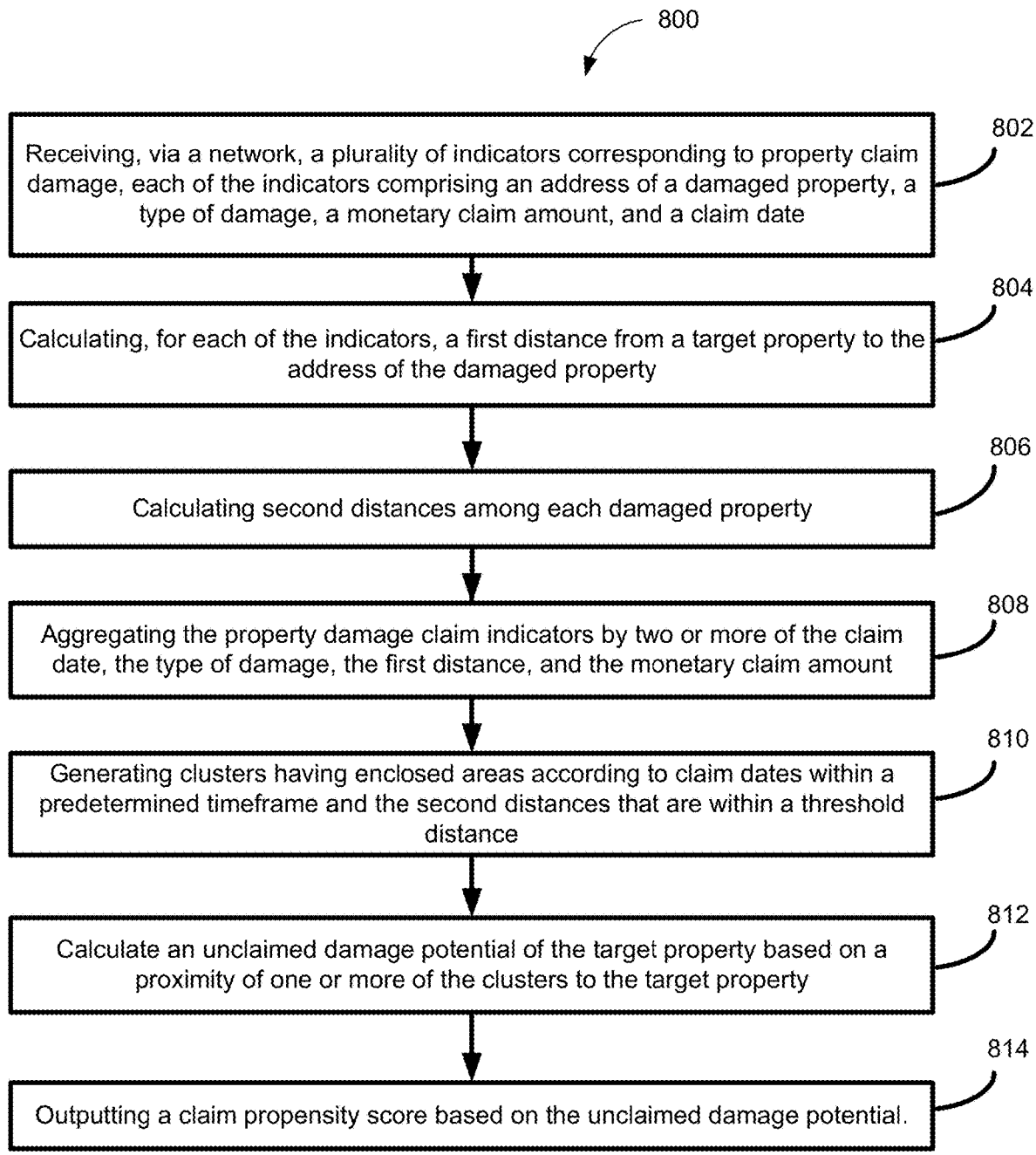
FIG. 8 is a flow diagram of a method in accordance with certain exemplary implementations of the disclosed technology.

An example method 800 for predicting damage to a target property will now be described with reference to the flowchart of FIG. 8. The method 800 starts in block 802, and according to an example implementation includes receiving, via a network, a plurality of indicators corresponding to property claim damage, each of the indicators comprising an address of a damaged property, a type of damage, a monetary claim amount, and a claim date. In block 804, the method 800 includes calculating, for each of the indicators, a first distance from a target property to the address of the damaged property. In block 806, the method 800 includes calculating second distances among each damaged property. In block 808, the method 800 includes aggregating the property damage claim indicators by two or more of the claim date, the type of damage, the first distance, and the monetary claim amount. In block 810, the method 800 includes generating clusters having enclosed areas according to claim dates within a predetermined timeframe and the second distances that are within a threshold distance. In block 812, the method 800 includes calculating an unclaimed damage potential of the target property based on a proximity of one or more of the clusters to the target property. In block 814, the method 800 includes outputting a claim propensity score based on the unclaimed damage potential.

In certain exemplary implementations, calculating the unclaimed damage potential to the target property may be based on a sum of overlapping clusters.

In certain exemplary implementations, the claim propensity score may be based on a sum of monetary claim amounts associated with one or more damaged properties associated with the clusters.

In accordance with certain exemplary implementations of the disclosed technology, the indicators may correspond to one or more insurance-related weather events. In certain exemplary implementations, the type of damage can include one or more of roof damage to a building, structural damage, damage due to debris, vehicle damage, water damage, hail damage, wind damage, hurricane damage, and tornado damage.

In certain exemplary implementations, the type of damage can include hail damage to a vehicle. In certain exemplary implementations, one or more damage claims for hail damage to a vehicle may be utilized to increase the claim propensity score for unclaimed roof damage potential.

According to an exemplary implementation of the disclosed technology, the accuracy of the clusters may be corroborated based on historical weather records.

In certain exemplary implementations, the enclosed areas can include convex hull polygons, wherein the enclosed areas are further based on one or more of the first distance, the threshold distance, and one or more second distances.

In certain exemplary implementations, generating of the clusters may be based on historical claims data.

In certain exemplary implementations, the indicators can correspond to a selected geographic region.

In certain exemplary implementations, a damaged property address and a target property address may be converted to longitude and latitude, and each of the first distance and the second distances may be calculated by: distance (km)= $12742*(\arcsin(\sqrt{0.5-\cos((lat2-lat1)*\pi/180)/2+\cos(lat1*\pi/180)*\cos(lat2*\pi/180)*(1-\cos((lon2-lon1)*\pi/180))/2)}))$, where lat1 corresponds to a latitude of a first address, lon1 corresponds to a longitude of the first address, lat2 corresponds to a latitude of a second address, lon2 corresponds to a longitude of the second address.

As used herein, the terms "data," "content," "information," and similar terms may be used interchangeably to refer to data capable of being transmitted, received, and/or stored in accordance with the disclosed technology. Thus, the use of any such terms should not be taken to limit the spirit and scope of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

Methods, apparatuses, and computer program products of the present disclosure may be embodied by any of a variety of devices. For example, the method, apparatus, and computer program product of an example embodiment may be embodied by a networked device, such as a server or other network entity, configured to communicate with one or more devices, such as one or more client devices. Additionally, or alternatively, the computing device may include fixed computing devices, such as a personal computer or a computer workstation. Still, further, example embodiments may be embodied by any of a variety of mobile devices, such as a portable digital assistant (PDA), mobile telephone, smartphone, laptop computer, tablet computer, wearable, or any combination of the aforementioned devices.

As will be appreciated, any such computer program instructions and/or another type of code may be loaded onto a computer, processor, or other programmable apparatus's circuitry to produce a machine, such that the computer, processor or other programmable circuitry that executes the code on the machine creates the means for implementing various functions, including those described herein.

It is also noted that all or some of the information presented by the example displays discussed herein can be based on data that is received, generated, and/or maintained by one or more components of apparatuses herein. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the subject matter and the operations described herein can be implemented in digital electronic circuitry, or computer software, firmware, or hardware, including the structures, disclosed in this specification and their structural equivalents, or combinations of one or more of them. Embodiments of the subject matter described herein can be implemented as one or more computer programs, i.e., one or more modules of computer program instructions encoded on the computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The terms "data processing apparatus," "computing devices," and "mobile computing devices" encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or another unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flow described herein can be performed by one or more programmable processors executing one or more computer programs to perform actions by operating on input information/data and generating output. Processors suitable for the execution of a computer program include, by way of example, both general and special purpose microprocessors, and one or more processors of any kind of digital computer. Generally, a processor will receive instructions and information/data from a read-only memory or a random-access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship between client and server arises by virtue of computer programs running on the respective computers and having a client-server relationship with each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

As utilized herein, the term "or" is used herein in both the alternative and conjunctive sense, unless otherwise indicated. The terms "illustrative" and "exemplary" are used to be examples with no indication of quality level. Like numbers refer to like elements throughout.

While this specification contains many specific implementation details, these should not be construed as limitations on the scope of any disclosures or of what may be claimed, but rather as descriptions of features specific to embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated with a single software product or packaged into multiple software products.

Thus, particular embodiments of the subject matter have been described. Other embodiments are within the scope of the following claims. In some cases, the actions recited in the claims can be performed in a different order and still achieve desirable results. Also, the processes depicted in the accompanying figures do not necessarily require the particular order shown, or sequential order, to achieve desirable results. In certain implementations, multitasking and parallel processing may be advantageous.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

APPENDIX
SALT FOR RELATIONSHIP LINKING

RELATIONSHIP:*relationshipname*:BASIS(*FieldList*):DEDUP(*FieldList*)
[:SCORE(*FieldList*)][:TRACK(FieldList)|MULTIPLE(*n*)|i:SPLIT(*n*)]
[:THRESHOLD(*n*)][:BLOCKTHRESHOLD(*n*)]

RELATIONSHIP:*relationshipname:RelationshipList*
[:MULTIPLE(*n*)] [:THRESHOLD(*n*)] [:BLOCKTHRESHOLD(*n*)]
[:LINK(NONE|ALL|DIRECT|CROSS)]

| | |
|---|---|
| *relationshipname* | User-specified logical name for an entity relationship to be computed in the relationship module |
| **BASIS(*fieldlist*)** | Specifies the basis for the relationship using the list of fields specified in the *fieldlist* parameter. The *fieldlist* contains a list of field names separated by a colon ':' character which must be equal between record pairs. Fields specified in the *fieldlist* following a :?: must be equal or null (left.field = right.field or left.field=null or right.field=null). Fields following a :-: implies the fields must not match. Fuzzy matching of fields is not currently supported. |
| **DEDUP(*fieldlist*)** | Specifies a list of field names separated by the colon ':' character for deduping when matching record pairs between clusters to compute the relationship count. The DEDUP prevents overcounting when a cluster contains multiple records containing equal basis fields. Typically, the fieldlist is the same as the fixed portion of the BASIS fieldlist. DEDUP fields must be part of the BASIS. |

| | |
|---|---|
| **SCORE(*fieldlist*)** | Specifies an optional list of fields separated by the colon ':' character which will be independently scored once per relationship. Fields following a :-: will be negated for the purpose of computing the threshold. SCORE fields cannot be part of the BASIS. |
| TRACK(fieldlist) | Specifies an optional list of RECORDDATE fields, to be used for tracking the dates over which relationship information is gathered. |
| **MULTIPLE(*n*)** | Specifies the minimum number of entity links n which must occur before a relationship is declared. |
| **SPLIT(*n*)** | Specifies the number of different persists that the main relationship join is split into (default if not specified is 1). Can improve performance and reduce disk space utilization. |
| **THRESHOLD(*n*)** | In SALT relationships are scored the same as internal linking, the same internal linking match threshold must be exceeded for a relationship to be declared (counted). The default threshold is the global default for internal linking. The THRESHOLD(n) parameter allows the default value to be overridden. |
| **BLOCKTHRESHOLD(*n*)** | BLOCKTHRESHOLD can be used to override the default block threshold used to compute relationships (which is five less than the overall default threshold). Lower numbers = more matches and slower times. |
| LINK(NONE\|ALL\|DIRECT\| CROSS | The LINK parameter is used to define how a given relationship is used to create link candidates for internal linking. The default is LINK(ALL). If LINK(NONE) is |

|  |  |
|---|---|
|  | specified, the relationship will not take part in internal linking. If LINK(DIRECT) is specified, the relationship will cause the two sides of the relationship to be considered as possibly two halves of the same entity. If LINK(CROSS) is specified, then if D1 r D2 & D1 r D3, then Cross will cause D2 & D3 to be considered as possible entity link candidates. If LINK(All) is specified, both the DIRECT & CROSS options are evaluated. Note: the relationship basis will be used to SUPPORT the fields of the basis in the matching logic. Thus, if you have a BASIS of (fname:lname) — then the NAME concept will be SUPPORTed by whatever the basis score is. This gives a way to get a very strong score for a field match if 2 (or more) relatively weak values for that field match between two entities. (For a fuller explanation of SUPPORT — see ATTRIBUTEFILE) |
| RelationshipList | The second form of the RELATIONSHIP statement allows a relationship to be formed as the sum of other relationships. The *RelationshipList* parameter allows a list of relationship names separated by the colon ':' character to be specified. |

SALT internal linking provides the capability to cluster together records to form an entity. In some situations, the objective is not to determine that two records or clusters are close enough to become part of the same entity, but to determine if a statistically significant link exists between the two clusters and to record this relationship. The RELATIONSHIP statement provides this function.

When clustering single entities using SALT internal linking, there may be insufficient information within one record to perform a link even with propagation of field values. SALT internal linking will leave those records unmatched. Relationships provide a way to record instances when multiple occurrences of specific set of fields (the BASIS field list) matching between clusters provide an additional clue that a match may exist. For example, when a name match isn't strong, but a first name, middle name and two different last names matching between clusters is becoming a lot stronger. Relationships are not currently used automatically as part of SALT linking, however using the RELATIONSHIP statement SALT can produce an additional relationship file that can be used to create an ATTRIBUTEFILE as input to another SALT process. For example, if you have a relationship between entity ID1 and ID2, the relationship file can be deduped and projected so that ID1⊠ID2 and ID2⊠ID1 are both in the file, then use an ATTRIBUTEFILE statement that declares one ID as the IDFIELD and the other ID as the VALUES field. See description below of the output format for a relationship file.

The core part of a SALT relationship is the BASIS; the basis is the list of fields which must be identical between two clusters for a linkage to exist. Fields following a :?: field in the basis field list must be identical or one must be null. Thus, a relationship which counts and weighs the number of shared addresses between two clusters could be:

RELATIONSHIP:COHABIT:BASIS(PRIMNAME:PRIMRANGE:CITYNAME:ST:?:SECRANGE)

Note that the sec-range comes after the :?: that defines that either they must be equal, or one must be null.

You can also a ATTRIBUTEFILE VALUES field as part of the BASIS for a relationship.

As it stands this would count all of the record-pairs between two clusters which match, however if a cluster had two or more copies of an address it could double count. To avoid this issue, you also specify a DEDUP criteria as a field list to dedup. It would be normal for the DEDUP criteria to be the same as the fixed portion of the basis. However, for addresses there can often be multiple names for one road and multiple ways of expressing one city. Thus, it is usually safest to simply dedup using the prim_range. For example:

RELATIONSHIP:COHABIT:BASIS(PRIM_NAME:PRIM_RANGE:CITY_NAME:ST:?:SEC_RANGE):DEDUP(PRIM_RANGE)

It should be noted that the DEDUP performs a smart dedup, it will actually look for the strongest link found for a given value of a DEDUP field. In the example presented above, if a link had been found with and without the sec_range it will use the one which includes the sec-range value. If DEDUP is omitted, it defaults to the whole of the basis. SALT also checks to ensure that all DEDUP elements are from the BASIS definition.

Within SALT relationship fields are scored the same as in internal linking and by default a linkage is declared if the internal linking match threshold is exceeded. This can be overridden using the THRESHOLD parameter on the RELATIONSHIP statement. As addresses usually have a specificity of around 28 it will generally then take 2 or more to cause a relationship to be declared. If you wish to force that a certain number of different links need to be found between clusters before declaring a relationship, then you can use the :MULTIPLE(n) option. Here n is the minimum number of linkages that must have been found. A linkage occurs between any two entity identifiers which share a common value for a given basis.

Sometimes you want to be able to use other information in the record outside of the basis to support the declaration of a linkage but without requiring it as part of the basis. For example, sharing of one address between two identifiers is probably not significant but if the identifiers also share an SSN or share a last name there is more likelihood of a relationship. These supporting fields can be declared using the SCORE parameter on the RELATIONSHIP statement with its associated field list. For example:

```
RELATIONSHIP:COHABIT:BASIS(PRIM_NAME:PRIM_RANGE:CITY_NAME:ST:?:SEC_RANGE):DEDUP(PRIMRANGE):SCORE(SSN:LNAME)
```

The fields in the score list are independent and will be maximized across all of the linkages taking part in one relationship (if more than one RELATIONSHIP statement have the same field in the SCORE list, the highest score for that field will be used for all RELATIONSHIP statements).

An issue with relationships is getting them to run in a reasonable amount of time. Relationships are the classical n-squared process and the n-squared is true of both time and disk space. SALT does a lot of work to optimize this process which results in a light-weight self-joins being used in the generated ECL, but disk-space utilization could still be high. The SPLIT(n) parameter on the RELATIONSHIP statement allows the core join to be split into parts each of which is persisted. This has the advantage of breaking a potentially very long join into n parts (allowing others a time slice) but also reduces disk consumption by a factor of n (provided the eventual links are fairly sparse). In terms of performance it should be noted that if n can be made high enough that the output of each join does not spill to disk then the relationship calculation process will have significantly faster performance. The following example shows the use of the SPLIT(n) parameter:

```
RELATIONSHIP:COHABIT:BASIS(PRIM_NAME:PRIM_RANGE:CITY_NAME:ST:?:SEC_RAN
GE):SPLIT(16):SCORE(LNAME:SSN):DEDUP(PRIMRANGE)
```

It is possible to have multiple RELATIONSHIP statements defined in one specification file. Each RELATIONSHIP is independently computed. The output for the relationship specified will be in the following format:

```
CombinationRecord := RECORD
   unsigned6 ID1;
   unsigned6 ID2;
   unsigned2 Basis_score; // Score allocated to the basis
   relationship unsigned2 Dedup_Val; // Hash will be stored in here
   to dedup unsigned2 Cnt; // Number of different basis matches
   shared between // clusters
   unsigned1 LNAME_score; // Independent score for the LNAME field
   unsigned1 SSN_score; // Independent score for the SSN field END;
```

*ID1* and *ID2* are the entity IDs being linked. The *Basis_score* is the accumulated score across all of the (deduped) basis matches that form the relationship. The *Dedup_Val* field is used for computation and may be ignored. *Cnt* is the number of different basis matches being used in the relationship. Then will come a score for each score field which has been maximized across all the basis matches in the relationship. The total score used to determine whether or not the matching threshold is exceeded is *Basisscore+Lnamescore+SSN score*.

Any field (BASIS or SCORE) which is part of a CONCEPT definition will be weighted appropriately when used inside BASIS or SCORE.

Relationships and Dates

It is possible to track the dates over which relationship information is gathered; provided you have RECORDDATE fields in your SPC. Any relationship can have a track list. TRACKing is there to provide date information about the relationship - it does NOT change the relationship computation in any way (other than possibly making it a little slower). For example:

```
RELATIONSHIP:COHABIT:BASIS(PRIM_NAME:PRIM_RANGE:CITY_NAME:ST:?:SEC_RANGE
):SCORE(LNAME:SSN):DEDUP(PRIM_RANGE):THRESHOLD(35):TRACK(dt_first_seen:d
t_last_seen)

RELATIONSHIP:CONAME:BASIS(FNAME:LNAME):MULTIPLE(2):TRACK(dt_first_seen
:dt_last_seen)
```

The system will then track for a 'first' date - the first date that BOTH elements of a relationship have a fact. For a 'last' date in is the last date that BOTH elements of a relationship share that fact. If a relationship is based upon multiple co-incidences it will find the earliest shared fact for a 'first' date and the latest shared fact for a last date. This is a slightly weird combination of mins and maxes - but semantically it works. As an example:

> A lives at 123 Main Street from 19800101 to 19900101
> B lives at 123 Main Street from 19850101 to 19870101
> A lives at 456 High Street from 19900101 to 20000101
> B lives at 456 High Street from 19870101 to 20100101

The system first computes the 'fact coincidence dates:

> A&B share 123 Main Street from 19850101 to 19870101 (the shorter range when both are there)
> A&B share 456 High Street from 19900101 to 200000101 (the shorter range when both are there)

Now the EARLIEST shared fact date is 19850101 and the latest shared fact date is 20000101. These represent an UPPER bound on the start of the relationship and a lower bound on the end of it.

NOTE: if shared facts do NOT overlap in time it is possible for the 'first' date to be after the 'last' date.

It is also possible to enforce some degree of date overlap within a single relationship. This is done by defining a RANGE field upon the two record dates. eg:

```
FIELD:dt_first_seen:RECORDDATE(FIRST,YYYYMM):5,0
FIELD:dt_last_seen:RECORDDATE(LAST,YYYYMM):5,0
```

```
RANGEFIELD:ReportedDate:RANGE(dt_first_seen,dt_last_seen):5,0
```

The two record-dates may be TRACKed if required (or not). ReportedDate can now be used as a (fairly) 'regular' field in the basis or score portion of a relationship. eg:

```
RELATIONSHIP:COHABIT:BASIS(PRIM_NAME:PRIM_RANGE:CITY_NAME:ST:?:SEC_RANGE)
:SCORE(SSN:LNAME:REPORTEDDATE):DEDUP(PRIM_RANGE):THRESHOLD(35):TRACK(dt_f
irst_seen:dt_last_seen)
RELATIONSHIP:CONAME:BASIS(FNAME:LNAME:?:REPORTEDDATE):MULTIPLE(2):TRACK
(dt_first_seen)
RELATIONSHIP:COSSN:BASIS(SSN:REPORTEDDATE):SCORE(LNAME):THRESHOLD(35):TRA
CK(dtlastseen)
```

Notes:
1. In a score the Global specificity for a date overlap is used (same as in internal linking)
2. In the optional portion of a basis - the dates can overlap OR one record does not have a date
3. In the fixed portion of a basis - there MUST be overlap in the dates. NOTE: A range field CANNOT be the ONLY (or FIRST) element of a basis

Combining Relationships with Different BASIS into a Single Relationship

It is also possible to define a relationship based upon other relationships. This is done using the relationship list. All relationships in the list must be normal relationships, grandparents are not allowed. This definition uses the second form of the RELATIONSHIP statement. Consider the following example which combines a COHABIT relationship with a COSSN relationship to form an association:

```
RELATIONSHIP:COHABIT:BASIS(PRIM_NAME:PRIM_RANGE:CITY_NAME:ST:?:SEC_RANGE)
:SPLIT(16):SCORE(LNAME:SSN):DEDUP(PRIM_RANGE):THRESHOLD(30)
RELATIONSHIP:COSSN:BASIS(SSN):SCORE(LNAME):DEDUP(SSN):MULTIPLE(2)
RELATIONSHIP:ASSOC:COHABIT:COSSN
```

This has two normal relationships and one that associates the other two together into a unified score. It should be noted that because the normal relationships are eventually going to be wired together by an association, you may need to weaken them as shown in the example using the THRESHOLD statement. Thus, the THRESHOLD(30) on COHABIT may be enough to capture a very rare single address (40 is the typical person threshold in the LexisNexis person data). For COSSN the MULTIPLE(2) parameter forces pairs of matching SSN for a relationship; this is an efficiency gained from the fact that a single SSN match is already being caught be the SCORE on COHABIT.

In principle ASSOC then simply combines the two underlying relationships together and adds the scores; it is therefore very efficient and uses the stored results of the two normal relationships. However, there is an issue in that between the child relationships there can easily be a lot of double-counting occurring because either:

a) Two relationships have identical fields in the SCORE attribute (in this case both have LNAME)
b) The SCORE attribute of one relationship might be part of the basis of another relationship (in this case COHABIT scores SSN which is part of the basis of COSSN)

SALT automatically picks this apart and:

a) Only picks the best score when multiple SCOREs clash
b) Assigns the SCORE from one relationship to the basis field of the other relationship and then does a MAX across those. (This is how a single SSN match gets picked up even though it is forbidden in COSSN).

Then the MULTIPLE and THRESHOLD parameters (or defaults) are applied to the child relationship. Thus, a MULTIPLE(3) will require 3 different data matches to have occurred between COHABIT and COSSN.

A lot of the detail of the child relationships is preserved in the output generated for a combined relationship. The format for the ASSOC example would be:

```
shared ASSOCCRec:= RECORD
    unsigned6 ID1; unsigned6 ID2;
    unsigned2 Total_Score:= 0;
    unsigned2 Total_Cnt 0;
    unsigned2 COHABIT_score:= 0;
    unsigned1 COHABIT_cnt:= 0;
    unsigned2 COSSN_score:= 0;
```

```
unsigned1 COSSN_cnt:= 0;
unsigned1 LNAME_score:= 0;
// Score for SSN will be rolled into COSSN as it is part of basis
END
```

Individual keys are also built by SALT for all relationships which are of included as part of another relationship. In addition, a relationship service is built for each relationship that is not the child of another one. This service takes a UID (unique id) and a depth and will produce rolled up data for every relationship in the tree that many levels deep. The *tree walking* aspect of this service is in the *relationship_links* module. The tree is walked so that each level of the tree is joined to the branch before via the strongest link. At each level the ID1 is the node being walked from and the ID2 is the node being walked to. The original node appears as a level 0 entry in ID2.

For example, using the *Sample_Input_Fileinternal AF Relationship_SPC* specification file in the SALT Examples module for internal linking produces the following results:

| | | |
|---|---|---|
| Result 1 | [2 rows] | Key::salt_test7::bdid::rel:cofein |
| Result 2 | [120 rows] | Key::salt_test7::bdid::rel:assoc |
| Match Sample Records | | |
| Slice Cut Candidates | | |
| Specificities | | |
| SPC Shift | | |
| Pre Clusters | | |
| Post Clusters | | |
| Pre Cluster Count | | |
| Post Cluster Count | | |
| Matches Performed | | 305 |
| Basic Matches Performed | | 132 |
| Slices Performed | | 14 |
| Rule Efficacy | [7 rows] | |
| Confidence Levels | [73 rows] | |
| Propagation Assisted Pcnt | | 17.04918032786885 |
| Propagation Required Pcnt | | 5.573770491803279 |
| Pre Pop Stats | [1 rows] | |
| Post Pop Stats | [1 rows] | |
| Validity Statistics | [1 rows] | |
| Id Consistency4 | [1 rows] | |
| Result 22 | [1 rows] | key::salt_test7::bdid::debug::specificities debug |
| Result 23 | [148375 rows] | key::salt_test7::bdid::debug::match candidates debug |
| Result 24 | [152 rows] | key::salt_test7::bdid::datafile::attribute_matches |
| Result 25 | [437 rows] | key::salt_test7::bdid::debug::match_sample_debug |
| Result 26 | [148375 rows] | key::salt_test7::bdid::datafile::patched candidates |
| Result 27 | [151475 rows] | temp::bdid::salt_test7::it1 |
| Result 28 | [6620 rows] | temp::bdid::salt_test7::change_it1 |

Result 1 is the file produced by the COFEIN relationship. This file contains the following:

|   | bdid1 | bdid2 | basis score | dedup val | cnt | company name score |
|---|---|---|---|---|---|---|
| 1 | 37178850 | 292680203 | 22 | 54286 | 2 | 11 |
| 2 | 292680203 | 37178850 | 22 | 54286 | 2 | 11 |

Result 2 is the file produced by the top-level relationship called ASSOC and contains the following:

|    | bdid1 | bdid2 | collocate score | collocate cnt | cofein score | cofein cnt | company name score | total cnt | total score |
|----|---|---|---|---|---|---|---|---|---|
| 1  | 28318440 | 81815873 | 12 | 1 | 0 | 0 | 11 | 1 | 23 |
| 2  | 31178850 | 292680203 | 0 | 0 | 22 | 2 | 11 | 2 | 23 |
| 3  | 41434192 | 42443948 | 13 | 1 | 0 | 0 | 11 | 1 | 24 |
| 4  | 42443948 | 41434192 | 13 | 1 | 0 | 0 | 11 | 1 | 24 |
| 5  | 81815873 | 28318440 | 12 | 1 | 0 | 0 | 11 | 1 | 23 |
| 6  | 82061141 | 286051048 | 9 | 1 | 11 | 0 | 8 | 1 | 28 |
| 7  | 176223914 | 387316952 | 12 | 1 | 0 | 0 | 11 | 1 | 23 |
| 8  | 286051048 | 82061141 | 9 | 1 | 11 | 0 | 8 | 1 | 28 |
| 9  | 292680203 | 37178850 | 0 | 0 | 22 | 2 | 11 | 2 | 33 |
| 10 | 387316952 | 176223914 | 12 | 1 | 0 | 0 | 11 | 1 | 23 |
| 11 | 408311407 | 408973906 | 12 | 1 | 0 | 0 | 11 | 1 | 23 |
| 12 | 408973906 | 408311407 | 12 | 1 | 0 | 0 | 11 | 1 | 23 |
| 13 | 427653229 | 994817609 | 10 | 1 | 11 | 0 | 4 | 1 | 25 |
| 14 | 994817609 | 427653229 | 10 | 1 | 11 | 0 | 4 | 1 | 25 |

What is claimed is:

1. A computer-implemented method for identifying a condition of an asset from a remote location, the method comprising:
receiving, via a network, a plurality of indicators corresponding to reported property damage, each of the indicators comprising:
an address of a damaged property;
a type of damage to the damaged property;
a monetary amount associated with the damaged property; and
an event date corresponding to the damaged property;
wherein the type of damage indicator comprises:
a fast indicator in which the indicator is received within a predetermined period of the event date corresponding to the damaged property, and
a slow indicator in which the indicator is received after the predetermined period of the event date corresponding to the damaged property;
determining, with one or more computer processors, relationships among the plurality of indicators by one or more of:
creating a core join data structure with at least a portion of all available property damage records;
splitting the core join data structure into persisted parts, wherein the persisted parts are configured for updating a shared structure between versions in memory to reduce disk utilization; and
clustering one or more of the persisted parts and the available property damage records;
calculating, for each of the indicators, a first distance from a target property to the address of the damaged property;
calculating second distances among each damaged property;
aggregating the property damage indicators by two or more of:
the event date;
the type of damage;
the first distance; and
the monetary amount;
generating, based on the clustering, two or more overlapping temporal-spatial clusters each having enclosed areas bound by closed polygons corresponding to historical weather events related to the fast indicators and the slow indicators, and according to event dates within a predetermined timeframe and the second distances that are within a threshold distance;
determining, based on the two or more overlapping temporal-spatial clusters, a likelihood of unreported damage based at least in part on the enclosed areas related to the fast indicators; and
outputting instructions to dispatch an inspector for damage verification of the target property when an address of the target property is within the two or more overlapping temporal-spatial clusters and when the likelihood of unreported damage is greater than a predetermined value.

2. The method of claim 1, wherein the two or more overlapping temporal-spatial clusters define a weather danger zone.

3. The method of claim 1, further comprising dispatching an inspector to the target property when the address of the target property is within the two or more overlapping temporal-spatial clusters.

4. The method of claim 1, wherein the indicators correspond to one or more weather events, and wherein the type of damage comprises one or more of roof damage to a building, structural damage, damage due to debris, vehicle damage, water damage, hail damage, wind damage, hurricane damage, and tornado damage.

5. The method of claim 1, wherein the type of damage comprises hail damage to a vehicle, wherein the hail damage to the vehicle is utilized as a fast indicator to increase the likelihood of unreported damage related to roof damage.

6. The method of claim 1, further comprising corroborating an accuracy of the clusters based on historical weather records.

7. The method of claim 1, wherein the enclosed areas comprise convex hull polygons, wherein the enclosed areas are further based on one or more of the first distance, the threshold distance, and one or more second distances.

8. The method of claim 1, wherein the generating of the clusters is based on historical reported damage and weather data.

9. The method of claim 1, wherein indicators correspond to a selected geographic region.

10. The method of claim 1, wherein a damaged property address and a target property address are converted to longitude and latitude, and wherein each of the first distance and the second distances are calculated by: distance (km)= 12742*(arcsin(sqrt(0.5-cos((lat2-lat1)*π/180)/2+cos(lat1* π/180)*cos(lat2*π/180)*(1-cos((lon2-lon1)*π/180))/2))),
wherein lat1 corresponds to a latitude of a first address, lon1 corresponds to a longitude of the first address, lat2 corresponds to a latitude of a second address, lon2 corresponds to a longitude of the second address.

11. A system for identifying a condition of an asset from a remote location, comprising:
a processor; and
a memory having programming instructions stored thereon, which, when executed by the processor, cause the processor to:
receive, via a network in communication with the processor, a plurality of indicators corresponding to property damage, each of the indicators comprising:
an address of a damaged property;
a type of damage to the damaged property;
a monetary amount associated with the damaged property; and
an event date corresponding to the damaged property;
wherein the type of damage indicator comprises:
a fast indicator in which the indicator is received within a predetermined period of the event date corresponding to the damaged property, and
a slow indicator in which the indicator is received after the predetermined period of the event date corresponding to the damaged property;
determine, with the processor, relationships among the plurality of indicators by one or more of:
creating a core join data structure with at least a portion of all available property damage records;
splitting the core join data structure into persisted parts, wherein the persisted parts are configured for updating a shared structure between versions in memory to reduce disk utilization; and
clustering one or more of the persisted parts and the available property damage records;
calculate, for each of the indicators, a first distance from a target property to the address of the damaged property;
calculate second distances among each damaged property;

aggregate the property damage indicators by two or more of:
- the event date;
- the type of damage;
- the first distance; and
- the monetary amount;

generate, based on the clustering, two or more overlapping temporal-spatial clusters each having enclosed areas bound by closed polygons corresponding to historical weather events related to the fast indicators and the slow indicators, and according to event dates within a predetermined timeframe and the second distances that are within a threshold distance;

determining, based on the two or more overlapping temporal-spatial clusters, a likelihood of unreported damage based at least in part on the enclosed areas related to the fast indicators; and output instructions to dispatch an inspector for damage verification of the target property when an address of the target property is within the two or more overlapping temporal-spatial clusters and when the likelihood of unreported damage is greater than a predetermined value.

12. The system of claim 11, wherein the two or more overlapping temporal-spatial clusters define a weather danger zone.

13. The system of claim 11, wherein the processor is further configured to automatically dispatching an inspector to the target property when the address of the target property is within the two or more overlapping temporal-spatial clusters.

14. The system of claim 11, wherein the indicators correspond to one or more weather events, and wherein the type of damage comprises one or more of roof damage to a building, structural damage, damage due to debris, vehicle damage, water damage, hail damage, wind damage, hurricane damage, and tornado damage.

15. The system of claim 11, wherein the type of damage comprises hail damage to a vehicle, wherein the hail damage to the vehicle is utilized as a fast indicator to increase the likelihood of unreported damage related to roof damage.

16. The system of claim 11, further comprising corroborating an accuracy of the clusters based on historical weather records.

17. The system of claim 11, wherein the enclosed areas comprise convex hull polygons, wherein the enclosed areas are further based on one or more of the first distance, the threshold distance, and one or more second distances.

18. The system of claim 11, wherein the generating of the clusters is based on historical reported damage and weather data.

19. The system of claim 11, wherein the indicators correspond to a selected geographic region.

20. The system of claim 11, wherein a damaged property address and a target property address are converted to longitude and latitude, and wherein each of the first distance and the second distances are calculated by: distance (km)= $12742*(\arcsin(\sqrt{0.5-\cos((lat2-lat1)*\pi/180)/2+\cos(lat1*\pi/180)*\cos(lat2*\pi/180)*(1-\cos((lon2-lon1)*\pi/180))/2)}))$, wherein lat1 corresponds to a latitude of a first address, lon1 corresponds to a longitude of the first address, lat2 corresponds to a latitude of a second address, lon2 corresponds to a longitude of the second address.

* * * * *